United States Patent [19]

Brown et al.

[11] 4,087,693

[45] May 2, 1978

[54] SENSORS FOR USE IN NUCLEAR REACTOR CORES

[75] Inventors: William L. Brown, Minneapolis; Robert L. Geronime, Rosemount, both of Minn.

[73] Assignee: Rosemount Inc., Eden Prairie, Minn.

[21] Appl. No.: 667,684

[22] Filed: Mar. 17, 1976

[51] Int. Cl.² ............................................. G01T 3/00
[52] U.S. Cl. ................................................... 250/390
[58] Field of Search .............................. 250/390–392; 174/110 A, 118

[56] References Cited

U.S. PATENT DOCUMENTS

| | | | |
|---|---|---|---|
| 3,390,270 | 6/1968 | Treinen et al. | 250/390 |
| 3,400,289 | 9/1968 | Anderson | 250/390 X |
| 3,787,697 | 1/1974 | Shields | 250/390 |

*Primary Examiner*—Davis L. Willis
*Attorney, Agent, or Firm*—Dugger, Johnson & Westman

[57] ABSTRACT

Sensors including radiation detectors and the like for use within the core of nuclear reactors and which are constructed in a manner to provide optimum reliability of the sensor during use.

15 Claims, 5 Drawing Figures

SENSORS FOR USE IN NUCLEAR REACTOR CORES

BACKGROUND OF THE INVENTION

1. Field of the Invention

The present invention relates to sensors or detectors for use in cores of nuclear reactors.

2. Prior Art

Radiation detectors which do not require external power but merely use an emitter, a collector, and an insulator material between the two to generate an electric current that is indicative of the intensity of the radiation are well known. For example, an article in "Atomnaya Enegriya", Vol. 10, No. 1, Pages 72-73, January, 1961 (a Russian publication) discloses a detector using an emitter, a collector and a dielectric material between the two to provide for measurements of neutron flux values.

In addition, a similar type of device is shown in U.S. Pat. No. 3,375,370 issued Mar. 26, 1968 to Hilborn.

Thus, while the principles of operation of such radiation detectors are well known, the problems of manufacturing reliable detectors has persisted. These detectors generally are of small diametral size, but of substantial length. For example, the detectors may be in the range of 1/16 inch in diameter, but may range from 30 feet to 130 feet or so in length.

At the present time, rhodium emitters insulated from an outer metallic conductor which is substantially more transparent than rhodium to neutron flux have been used quite extensively but satisfactory designs suitable for use in a nuclear reactor have not been completely successful. The insulation material generally used in the prior art is a ceramic insulation, and specifically highly compacted aluminum oxide or magnesium oxide insulators have been used extensively. Generally, a type of cable having an outer tubular jacket, and internal ceramic insulators surrounding a lead wire is assembled and then mechanically swaged. The swaging results in a density of insulation of typically 8% of a solid material and also causes elongation and other deformation of the inner wire. This same assembly technique has been used for the rhodium sensor. The sensor assembly is then brazed to the cable, with the sensor being brazed to the center lead wire, and the two outer sheaths being brazed together. This process places two brazed joints in an area where radiation is high and such joints have resulted in many failures. Once the joint between the two outer sheath sections fails, moisture destroys the insulating capabilities of the insulating material and the sensor is no longer useful. Also, the brazed joint between the lead wire, which is typically a nickel alloy such as Inconel, and the rhodium element itself will fail.

Insulation materials, such as magnesium oxide and aluminum oxide, absorb significant amounts of the charged particles emitted by the rhodium emitter so that a high density of insulant reduces the signal level. Further, particularly in the case of magnesium oxide, it is almost impossible to sufficiently dry out a length of that insulation once it has become moist, either in the manufacturing process or through mishandling at a subsequent time.

The conventional way of assembling long lengths of magnesium oxide or aluminum oxide cable is to begin with relatively short (6 inch) cast cylindrical sections of the insulating material which are slid over a wire and then the wire and insulation cylinders are placed into a tube which is subsequently drawn through a die or swaging machine compacting the outer metal tube against the ceramic cylinder sections and then against the inner wire. This can result in nicks in the conducting wire between individual sections and in some cases actual breakage of the wire since the material must be crushed and compacted before flowing results. In addition location of the hole in the cast cylindrical sections may vary significantly from the center axis resulting in poor radial symmetry of the wire with respect to the tube. To fabricate the relatively long lengths required for in-core detectors without splices, it is customary to redraw or re-swage the assembly several times. This results in non-uniform deformation and weakening of the wire. Further it is almost impossible to cast the length of ceramic tubing completely uniform so that the resulting structure, after drawing, is a wire held within an outer tube which is not normally located in the center of the tube throughout its length but may snake back and forth along the length of the tube. Emitters which are not uniform in cross section or centering from one sensor to another will yield non-interchangeable outputs and cause difficulties in measurement in application.

SUMMARY OF THE INVENTION

The present invention relates to a sensor for use in a nuclear reactor core which can be manufactured in such a way that brazed joints or splices are avoided, and the insulation material used may be of relatively low density of compaction and will center the emitter and the lead wire with respect to the outer sheath or tube without deformation or varying geometry of the center wire or emitter.

The sensor comprises a lead wire of Inconel or similar material, a rhodium or other suitable emitter material element welded to the end of the lead wire, an outer metal sheath, and insulation material initially in a woven or braided form between the lead wire and element assembly and the outer sheath.

The sheath tube is continuous throughout its length. There is no joint where two sections of the sheath are brazed together, and the joint between the Inconel lead wire and rhodium element is welded which makes it relatively immune to degradation from nuclear radiation as compared to a brazed joint.

In construction, the insulation is initially in the form of a cloth or woven material of silicon dioxide that is formed into a loose sock over the element and lead wire. Then the subassembly is inserted into a length of metal tubing forming a sheath which is subsequently drawn through a sizing die. At high levels of compaction the silicon dioxide fibers are quite easily broken because they are relatively brittle and the broken pieces move or flow with some preference for axial alignment as the outer sheath is drawn through the die. This fragmented insulation then flows easily around the lead wire and rhodium element and centers it almost perfectly throughout its length. There are no hard spots or sleeve junctions that might cause a nick or bend in the lead wire, such as are common in the prior art methods where several relatively short lengths of tubular ceramic insulation material are used. Further, because the sleeving can be made in long continuous lengths, relatively long lengths of the sheathed assembly may be made in a single pass draw or swage rather than multiple passes and subsequent wire deformation as is customary with short cast ceramic pieces of alumina or magnesia.

The end of the outer sheath extends out beyond the emitter element and is then filled with a solid plug. The plug packs the insulation adjacent to the element and the tube is rolled over the end of the plug and sealed off with a weld. The use of a plug at the lower end of the sheath, adjacent the rhodium element, provides a backing member for the welding which will completely seal the sheath, without requiring brazing. The tight fitting plug serves the purpose of preventing any of the silicon dioxide from being introduced into the weld puddle thus avoiding voids in the weld puddle which are a possible source of leakage into the sheath or tube in application.

The opposite or remote end of the sheathed assembly can be handled in a conventional manner since it is out of the radiation field. Brazing or crimping can be used to fasten the remote end to a conventional connector head. In the form shown however, a ceramic seal material is used at the remote end of the sheath (opposite from the sensing element) in order to hermetically seal the interior of the sheath and keep the insulation dry.

The second form of the sensor shown in a thermocouple that is constructed substantially the same as the radiation detector just described and uses the same type of insulation around each of the lead wires from the thermocouple to insure that the wires are properly spaced from the outer sheath and from each other, and do not have kinks or nicks in them.

The absence of brazed joints in the outer sheath insures the reliability of the sheath material in the radiation environment, and prevents moisture from contacting the insulation material.

DESCRIPTION OF THE PREFERRED EMBODIMENTS

Figure 1:
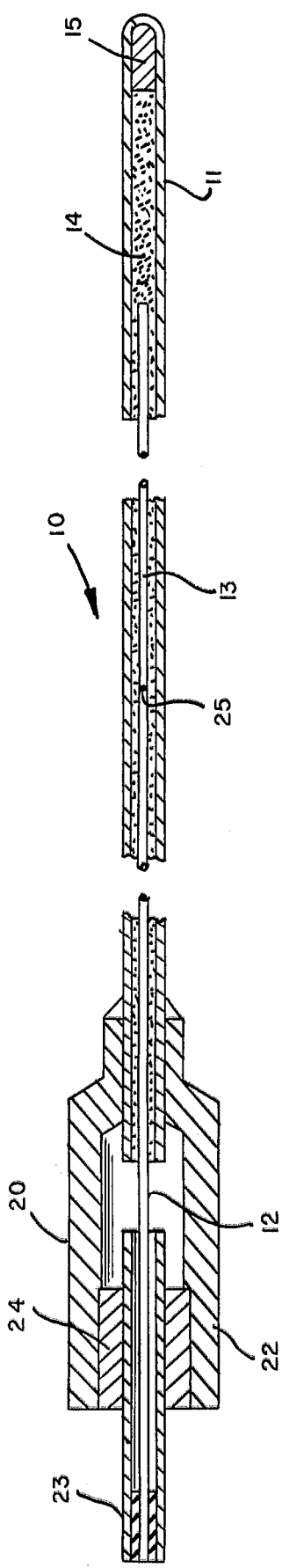
FIG. 1 is a longitudinal sectional view of a typical in-core radiation sensor constructed in accordance with the present invention.

A radiation detector of the self-powered type for use inside a nuclear reactor is shown generally at 10. The detectors operates in a known manner in that a core of material which acts as an emitter of charged particles when subjected to neutron radiation is insulated from a collector which will collect charged particles being emitted from the emitter. A potential difference tends to be established between the emitter and the collector, and this potential difference is a function of the level of radiation and is measured through conventional current or charge measurement techniques. For example, in U.S. Pat. No. 3,375,370 the instrumentation and theory of operation of such a detector is disclosed. Conventional potentiometric balance techniques may also be used. It should be noted however that a space charge is present between the emitter and collector and is due to the absorbtion of charged particles by the insulant used between the emitter and collector. An effect of this space charge is to inhibit the transit of charged particles from the emitter to the collector and the magnitude of this inhibiting effect is a function of the insulant material and increases with density of compaction.

The sensor or detector 10 as shown comprises a tubular outer sheath 11 and a center lead wire 12 which is fastened in a suitable manner to an emitter element 13. The lead wire 12 and emitter element 13 are surrounded by an insulating material 14. At the end of the sheath 11 adjacent the emitter 3, the insulation material 14 substantially fills the tubular sheath, and a metal plug 15 is placed at the end of the sheath. In forming, the normally open end of the tubular sheath is then rolled over against the end of the plug, and a weld indicated generally at 16 is used to seal the sheath with respect to the plug, and completely seal the interior of the sheath. The opposite end of the sheath has a connector 20 mounted thereon. An outer housing 22 forming a portion of the connector can be conveniently brazed to the sheath 11, inasmuch as connector assembly 20 is spaced from the intense radiation field, and the outer housing 22 has a center opening through which the lead wire 12 extends. The lead wire extends through and is physically and electrically connected to a surrounding tube 23 that in turn is insulated from the connector 20 with suitable ceramic material 24 that hermetically seals the end opening of housing 22.

The tube 23 and housing 22 can then form the lead connections from the emitters, comprising the rhodium element 13, and the collector, comprising the outer sheath 11. In the normal construction, the outer sheath will be made of Inconel tubing, and the lead wire 12 will also be Inconel or metal having similar properties.

The insulation material 14 preferably is available in a fiber form, has relatively low absorbtion of charged particles given off by the emitter and has high electrical resistance at an elevated temperature. Silicon dioxide or quartz is available in fiber form and also has the characteristics of good insulation and relatively low absorbtion compared to aluminum oxide or magnesium oxide for example. The insulating threads can be woven, and suitable woven tubes of silicon dioxide fibers which form long sleeves are available from Hitco Company Inc., Gardena, Calif., under the trademark "Refrasil". In the form of the material that is available, it is first made into this long tubular sock or sleeve from glass fiber material. Once the sleeve has been woven, the glass fiber is leached extensively to remove all the constituents from the glass fiber except the silicon dioxide. The resulting sleeve is somewhat porous, but it is essentially pure silicon dioxide fibers. The material is sufficiently manageable in this tubular sleeve form so that it can be threaded over a long length of wire comprising lead wire 12 and the rhodium element 13 which have been welded together. The fibers remain uniform in thickness so the long wire is nearly exactly centered in the sleeve with respect to the outer sleeve diameter.

Then the assembly of this long wire with the sleeve of silicon dioxide material over it is threaded into the outer sheath or tube 11 which is large enough in diameter to receive the assembly. The tube is then passed through a sizing die and drawn to a smaller diameter. The pure silicon dioxide fibers are easily broken and have some fluidity as the assembly is drawn through a die. Drawing the tube until reaching a density of the insulation material of approximately 65% to 70% of the pure silicon dioxide gives very satisfactory results, and because the material flows readily and uniformly, the central wire is almost perfectly aligned on the center of the outer sheath 11 and is uniformly held along its entire length without crimps or kinks or any deformation to the wire. This is especially important over the emitter portion since uniformity from one detector to another is necessary for satisfactory operation. The final density of compaction may be controlled over a wide range by the degree of drawing and insulation densities of from about 35% to slighty greater than 70% of pure silicon dioxide are practical with this method of construction, as subsequently explained.

Figure 3:
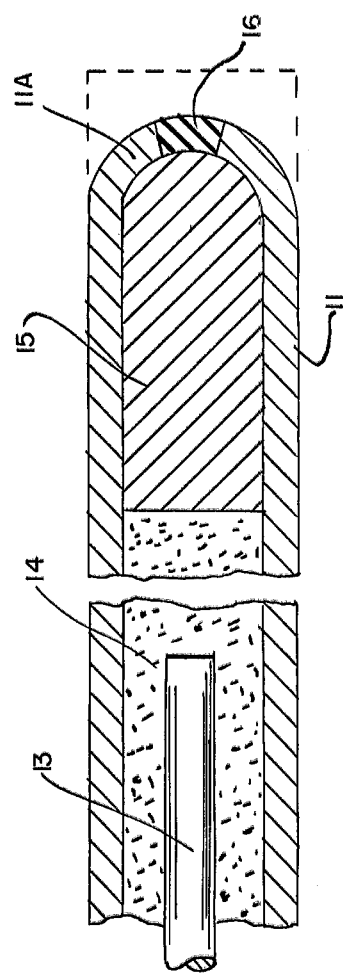
FIG. 3 is a fragmentary enlarged sectional view showing the sensor end construction of the outer sheath tube.

The location of the emitter is determined, and the tube or sheath 11 is trimmed at its end adjacent to the emitter in a suitable location. Then the plug 15 as shown in FIG. 3 is inserted, and the ends of the sheath 11 are rolled over as shown at 11A in FIG. 3. A suitable weld 16 is then used to join the plug 15 to the sheath. The plug forms a solid backing to prevent imperfections and also to prevent the introduction of any of the silicon dioxide into the weld zone, which may cause weld blows and voids. This arrangement of rolled-over sheath and plug also prevents the possibility of a section of the sheath being dangerously low in cross section dimension at or near the weld joint. The welded plug completely seals the interior of the tube.

Figure 2:
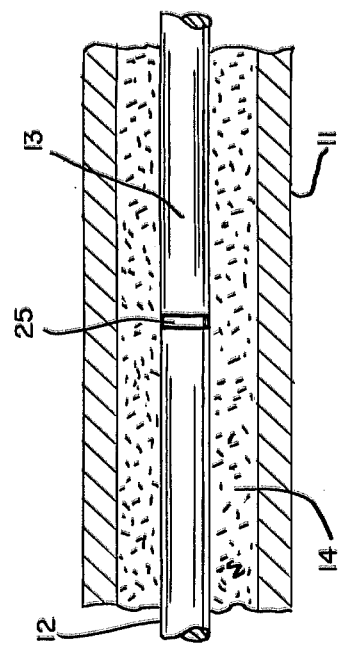
FIG. 2 is a fragmentary enlarged side view of a typical joint between the sensing element and the lead wire used with the sensor of the present invention.

In FIG. 2, a butt weld indicated generally at 25 is used to join the emitter 13 and the lead wire 12. This weld is not affected to any substantial degree by radiation since there is no introduction of braze materials which may be affected by the radiation environment, and is not as susceptible to breakage as a brazed joint. When the emitter and lead wire can be assembled before they are placed into the insulation material, as in the form shown, a butt weld may be used without any problems.

It should also be noted that instead of forming the fibers into a woven sleeve the silicon dioxide fibers may be formed of woven directly onto the lead wire and emitter with conventional winding or weaving techniques.

In a radiation sensor of this type it is important that all sensors have a known calibration factor, and any change in dimension of the rhodium element during the assembly process causes a calibration shift. Poor alignment of the element and lead wire within its surrounding tube and variations in density of the insulation also cause differences in calibration between units. This has been especially noticeable in prior art designs where hard ceramic tubes over the sensing element are used in the assembly process. With the present design which uses material initially in the form of small fibers, the rhodium element can be measured and cut to size before assembly and the compacting action, which is relatively gentle, serves to physically locate the rhodium element and lead wire in the center of the sheath and while holding it firmly does not significantly change its dimensions. The resulting density of compaction may be made much lower than prior art devices giving less absorbtion of charged particles under radiation and hence increased signal capability for the sensor.

Since most insulation materials also absorb moisture, the relative porosity of the insulation material made in this manner permits the element to be readily dried out if it should pick up moisture in the assembly process. In comparison, the prior art ceramic materials, when subjected to moisture, are almost impossible to dry out and both ends of the assembly must be cut off or "trimmed" until the moisture is removed.

As an example a group of nine sensors was assembled and then tested in a radiation environment. The sensing element was 1000 mg of rhodium wire having a diameter of 0.02 inch. The lead wire was 0.02 inch diameter Inconel wire and the sheath also was Inconel tube having an O.D. of 0.090 inch and a wall thickness of 0.0125 inch. The insulant was a woven sleeve of substantially pure silicon dioxide fiber (99% pure) sold under the trademark "Refrasil". The woven sleeve has about 1/32 inch I.D. and had a "wall" of about 0.01 inch. The sleeve was placed over the wire, and this subassembly placed into the sheath. The sheathed assembly was drawn to an outside diameter of 0.062 inch. The density of compaction of the insulation was to about 70% that of solid silicon dioxide. The drawn assemblies were easily dried with mild heat after which they showed electrical insulation of $10^{14}$ to $10^{15}$ ohms at room temperature. The units were calibrated in a radiograph facility at a radiation level of about $10^7$ NVT per second and the uniformity of signal level between sensors was within about ± 1% compared to industry specifications based on prior art designs of about ± 4%. This uniformity was achieved without any selection or compensation procedures after the assembly operation. The signal level of the sensors was about 5–10% higher than prior art designs using high compaction aluminum oxide or magnesium oxide.

The improvement in "background" current level over prior art designs has also been found to be significant. The background current is that current level which exists in the presence of radiation and is attributed to mechanisms other than the emission of charged particles by the sensing element. The background current was measured on six units constructed in the same manner as for the nine units described above except that no rhodium element was present. The background current was determined to be very low and varied between ± 2.5 × $10^{-11}$ amperes per centimeters of exposed length for these units at a radiation level of 2 × $10^{13}$ NOT per second. The reason for the low background current is not completely understood but it is due in part, to the type and density of insulant and the construction described. Background currents of this magnitude are considered excellent in the field. In addition, units constructed in this manner exhibit stable output when first subjected to a radiation environment compared to prior art units which typically require several hours or even days to stablize.

Figure 4:
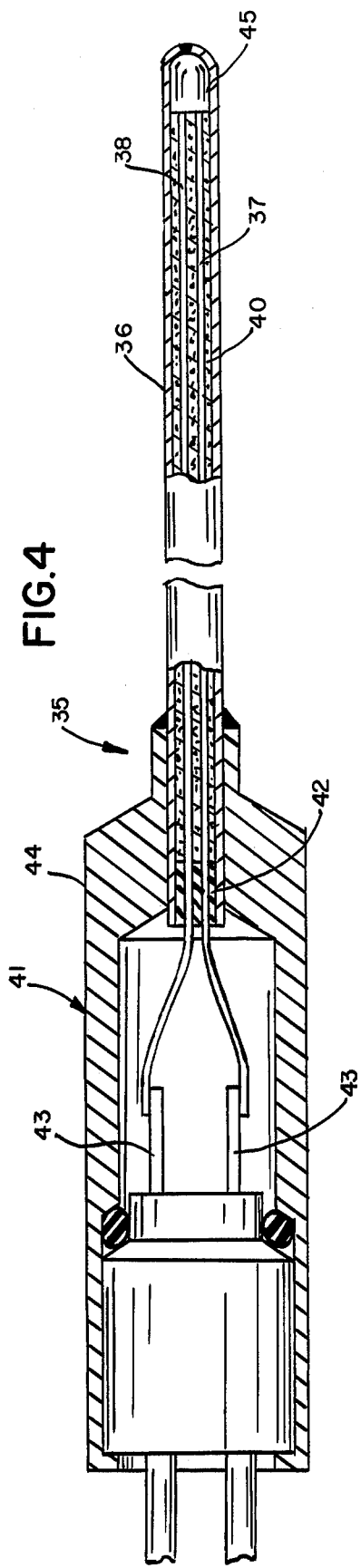
FIG. 4 is a side view of a thermocouple used in a radiation environment with parts in section and parts broken away.
Figure 5:
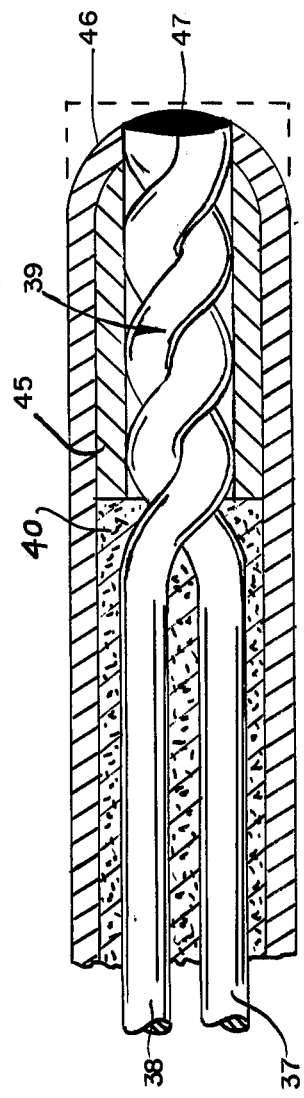
FIG. 5 is a vertical sectional view of an end portion of the thermocouple of FIG. 4 showing the internal construction thereof.

In FIGS. 4 and 5, a second form of a sensor for use in a radiation environment is disclosed. This second form is a thermocouple, and it is constructed in substantially the same manner as the radiation detector. The thermocouple indicated generally at 35 includes an outer sheath 36, and a pair of wires 37 and 38, which as shown in FIG. 5 are joined together at the sensor end by twisting them generally as indicated at 39. The wires are supported within the sheath 36 by insulation material 40 that separates both of the wires from each other and from the sheath. A connector 41 is provided at the opposite end of the thermocouple assembly from the sensing end, and as shown a suitable inorganic cement 42 may be provided adjacent this end to prevent any of the silicon dioxide from falling out with subsequent shorting of the thermocouple wires to sheath 36. The wires 37 and 38 are connected to leads 43 of the same material that are mounted on the inside of an outer housing 44 of the connector assembly 41. The connector assembly 44 can be brazed to the sheath 36 for convenience inasmuch as it is not in the intense radiation environment.

The thermocouple connection indicated at 39 is made by twisting the two wires 37 and 38, which may be made of Alumel, and Chromel, respectively, and the twisted section is surrounded by a tube 45 that permits the end of the sheath 36 to be folded over as at 46. The tube 45 provides a backing and prevents insulant from entering the weld puddle so that the open portions of the tube, after having been folded over as at 46, may be welded with a weld of suitable size to form the thermocouple junction as well as seal the interior of the sheath 36.

The insulation material 40 in this form of the invention is the same silicon dioxide as shown in the previous form of the invention, and each of the wires 37 and 38 can be inserted into a woven sheath of the silicon dioxide fibers. Then the sheath 36 is slipped over the assembly of the layers and insulation material sheath and the outer sheath 36 is passed through a forming die to provide some compaction of the fibrous insulation and causing it to space the wires 37 and 38 uniformly and keep them separated from each other and from the sheath in a desired manner.

In both forms of the invention, therefore, splices are avoided. Also the insulation is of relatively low density of compaction and avoids the use of high density ceramic tubes or other insulating materials which also cause damage to the wires.

The term sleeve of fibers means a woven or braided tubular sock like member that is continuous throughout its length. Separate sleeves of silicon dioxide are illustrated in published literature of Hitco, 1600 West 135th Street Gardena, Calif. U.S.A.

The densities described herein were determined by measurements made according to an AEC Reactor Development and Technology Standard C2-1T entitled "Determination of Insulation Compaction in Ceramic Insulated Conductors", as amended September 1973. This test specifies a kerosene absorption technique which comprises drying and weighing of test samples, soaking them in kerosene and subsequently weighing and computing the percent of maximum theoretical density of the insulation from the results. The samples tested were constructed of Inconel tubing of 0.90 outer diameter with a 0.0125 wall, an Inconel wire of 0.02 inches diameter and "Refrasil" sleeving having a wall thickness of about 0.01 inches. Samples were drawn down to outside diameters ranging from 0.0805 to 0.060 and the degree of compaction of the insulation was measured for a 2-inch length cut from each sample. No significant crushing of the insulation material occurred between the lowest density of 35% to about 50% density. The percentage number refers to the ratio of insulation density to the density of solid insulation material. This may be referred to as percent maximum theoretical density.

While the lead wire was not tightly held after drawing at the 35% to 50% density range, the wire was still constrained sufficiently so that the two inch samples could be freely handled without danger of the inner wire falling out. At a compaction level of about 55% density, the insulation fibers were just starting to crush adjacent the inner wire and the inner wire could still be forcibly withdrawn from the sample at this level. Slightly above this density, as for example at about 58% density many of the fibers of insulation material were broken and the inner wire was held securely.

At a compaction level of about 65% to 66%, the fibers were substantially all broken but strands were still quite long, being of the order of 0.040 inches or longer. However, above about 66% compaction, the strands were substantially crushed and the material is more in the form of a highly compacted mat of very short strands. The most highly compacted sample tested reached a density of 73% of maximum theoretical density at a tube diameter of 0.060 inch. There was no evidence of inner wire damage by this manufacturing techbnique and the inner wires were held very snuggly for the samples evaluated in the 58% to 73% compaction range, which represents the preferred range because of the secure holding of the wire, resulting in excellent mechanical integrity.

In the process the complete steps include:

1. Butt welding the lead wire and element without substantially changing the cross sectional area of the wires at the weld. (The weld nugget must not exceed the wire diameter by more than a few thousands of an inch).

2. Sleeving the wire assembly in a generally uniform wall continuous sleeve of fibers of insulation material such as silicon dioxide.

3. Placing the wire and sleeve into an outer sheath.

4. Drawing the sheath to a reduced diameter in a suitable die or dies (one or more passes) to uniformly compact the insulation material until the lead wire and element assembly are sufficiently secured to prevent movement of the lead wire and element assembly relative to the sheath in use, and without drawing the inner wires to change their diameters. Generally compaction of the insulation on the order of 35% to 73% of the density of solid silicon dioxide is sufficient with a preferred range of 58% to 73% density.

5. Drying the insulation, is necessary.

6. Closing the sheath at the element end and installing the connector at lead wire end while hermetically sealing the assembly.

We claim:

1. A sensor assembly for use in radiation environments comprising an elongated joint free outer sheath, at least one wire means for carrying signals within said outer sheath, insulation means in said sheath closely surrounding said wire means for holding said wire in insulated, spaced relationship to the outer sheath, one end of said wire means terminating in means forming a sensor to be used in the radiation environment, and means closing the end of said outer sheath adjacent said means forming a sensor comprising a backing member on the interior of said sheath, the end of said sheath having a wall portion engaging said backing member, and weld means welding the wall portion of said sheath and said means forming the backing member together to close the end of said sheath adjacent said means forming a sensor.

2. The combination as specified in claim 1 wherein said insulation means comprises strands of silicon dioxide crushed and packed around said wire means.

3. The combination as specified in claim 2 wherein said outer sheath is originally of larger diameter than the finished size thereof, and said silicon dioxide insulation material is formed into a loosely woven sleeve of silicon dioxide fibers surrounding said wire means when placed into said sheath, said sheath subsequently being compressed to pack said silicon dioxide fibers securely around said wire means.

4. The combination as specified in claim 3 wherein said wire means comprises a single lead wire substantially centered in said outer sheath, and said sensor comprises an emitter element spot welded to said lead wire means.

5. The combination as specified in claim 3 wherein said wire means comprises a pair of wires and said means forming a sensor comprises a junction portion joining said pair of wires, said wires being selected to provide a thermocouple junction portion.

6. The combination as specified in claim 3 and means hermetically sealing said wire means with respect to said outer sheath at an opposite end of said sheath from the means forming a sensor.

7. A method of making a sensor for use in radiation environments, said sensor being of a substantial length in relation to its diameter comprising the steps of providing lead wire means, said lead wire means terminating in a sensor portion, placing loosely woven elongated threads of a suitable dielectric material over said lead wire means and sensor portion, placing the assembly of said lead wire means and said loosely woven dielectric into an outer sheath of larger diameter than the finished sensor diameter, and reducing the diameter of said outer sheath in a sizing step to pack said loosely woven material around said lead wire means.

8. The combination as specified in claim 7 wherein said lead wire means comprises a single lead wire, and including the step of welding an emitter element for use in a radiation sensor to the end of said lead wire means to form the sensor portion prior to the surrounding of the lead wire means with the loosely woven insulation material.

9. The combination as specified in claim 8 including the further step of providing a plug on the interior of said sheath adjacent the sensor end through an open end of said sheath with the plug spaced and insulated from said sensor portion, folding the open end of said tube around said plug, and closing said tube to said plug.

10. A neutron detector comprising an elongated length of straight lead wire, a length of straight sensor wire joined in end to end relation to said lead wire, an insulation layer over said lead wire and sensor wire initially comprising a continuous sleeve formed of loosely joined fibers, said sleeve initially extending unbroken along the entire usable length of said sensor wire and lead wire, an outer sheath surrounding said insulation layer and compressed against said sleeve to increase the density of said insulation layer sufficiently to mechanically hold said lead wire and sensor wire securely with respect to said sheath.

11. The combination as specified in claim 10 wherein said sleeve comprises fibers of substantially pure silicon dioxide.

12. The detector of claim 10 wherein said lead wire and sensor wire are butted in end to end relation and welded together without substantially changing the diameter of the wires in the weld region.

13. The detector of claim 10 wherein said sheath comprises a tube of metal substantially homogenous throughout the length of the portion thereof which surround said lead wire and sensor wire.

14. The detector of claim 13 wherein the sheath is compressed against said sleeve to increase the density of the insulation layer into the range of 35% to 73% of the density of the insulation material fibers.

15. The detector of claim 13 wherein the sheath is compressed against said sleeve to increase the density of the insulation layer into the range of 58% to 73% of the density of solid insulation material fibers.

* * * * *

UNITED STATES PATENT OFFICE
CERTIFICATE OF CORRECTION

Patent No. 4,087,693  Dated May 2, 1978

Inventor(s) William L. Brown et al.

It is certified that error appears in the above-identified patent and that said Letters Patent are hereby corrected as shown below:

Column 1, line 41, "8%" should be--85%--. Column 3, line 57, "detectors" should be--detector--. Column 4, line 14, "emitter 3" should be--emitter 13--. Column 6, line 44, "NOT" should be--NVT--. Column 8, line 15, "techbnique" should be--technique--.

Signed and Sealed this

Nineteenth Day of September 1978

[SEAL]

Attest:

RUTH C. MASON
Attesting Officer

DONALD W. BANNER
Commissioner of Patents and Trademarks